US012743789B2

(12) United States Patent
Han et al.

(10) Patent No.: US 12,743,789 B2
(45) Date of Patent: Sep. 22, 2026

(54) SIAMESE REGION PROPOSAL OBJECT TRACKING

(71) Applicants: AGENCY FOR DEFENSE DEVELOPMENT, Daejeon (KR); SEOUL NATIONAL UNIVERSITY R&DB FOUNDATION, Seoul (KR)

(72) Inventors: Bohyung Han, Seoul (KR); Minji Kim, Seoul (KR)

(73) Assignees: AGENCY FOR DEFENCE DEVELOPMENT, Daejeon (KR); SEOUL NATIONAL UNVIERSITY R&DB FOUNDATION, Seoul (KR)

( * ) Notice: Subject to any disclaimer, the term of this patent is extended or adjusted under 35 U.S.C. 154(b) by 222 days.

(21) Appl. No.: 18/370,531

(22) Filed: Sep. 20, 2023

(65) Prior Publication Data

US 2024/0104749 A1 Mar. 28, 2024

(30) Foreign Application Priority Data

Sep. 20, 2022 (KR) ........................ 10-2022-0118562

(51) Int. Cl.
*G06T 7/246* (2017.01)
*G06N 20/00* (2019.01)
*G06T 7/11* (2017.01)

(52) U.S. Cl.
CPC ............. *G06T 7/246* (2017.01); *G06N 20/00* (2019.01); *G06T 7/11* (2017.01); *G06T 2207/20084* (2013.01)

(58) Field of Classification Search
CPC . G06T 2207/10016; G06T 2207/20084; G06T 7/20; G06T 7/246
See application file for complete search history.

(56) References Cited

U.S. PATENT DOCUMENTS 11,227,179 B2 1/2022 Rhodes et al.
2021/0295529 A1* 9/2021 Li .......................... G06T 7/174
(Continued)

FOREIGN PATENT DOCUMENTS

KR 2020-0023221 A 3/2020
KR 2020-0050553 A 5/2020
(Continued)

OTHER PUBLICATIONS

Llerena et al., "Gaussian Bounding Boxes and Probabilistic Intersection-over-Union for Object Detection". (Year: 2021).*
(Continued)

*Primary Examiner* — Kenny A Cese
(74) *Attorney, Agent, or Firm* — MILES & STOCKBRIDGE P.C.

(57) ABSTRACT

Devices, systems, methods, and instructions for object tracking based on deep-learning are provided, including pre-training a model for object tracking based on pre-input learning data, receiving a target image of which at least one area contains an image corresponding an object for tracking and a search image of which at least one area contains an image corresponding the object for tracking, and obtaining information on area for tracking regarding to the area corresponding to the object for tracking in the search image by applying the model for object tracking, wherein the area corresponding to the object for tracking is defined by a Gaussian distribution model, and the information on area for tracking includes parameter values of a plurality of parameters based Gaussian distribution corresponding to the area corresponding to the object for tracking.

11 Claims, 9 Drawing Sheets

500

510

520

(56) References Cited

U.S. PATENT DOCUMENTS

| | | | | |
|---|---|---|---|---|
| 2021/0397254 | A1* | 12/2021 | Seibel | G06T 7/74 |
| 2022/0012890 | A1* | 1/2022 | Wu | G06T 7/11 |
| 2022/0125280 | A1* | 4/2022 | Tyan | A61B 5/0035 |
| 2023/0316536 | A1* | 10/2023 | Lee | G06T 3/02 |

FOREIGN PATENT DOCUMENTS

| | | | |
|---|---|---|---|
| KR | 102140255 | B1 | 7/2020 |
| KR | 20210085569 | A | 7/2021 |
| KR | 20210111417 | A | 9/2021 |

OTHER PUBLICATIONS

Li et al. "High Performance Visual Tracking with Siamese Region Proposal Network", 2018 IEEE/CVF Conference on Computer Vision and Pattern Recognition (Year: 2018).*

Llerena, Jeffri M., et al. "Gaussian bounding boxes and probabilistic intersection-over-union for object detection." arXiv preprint arXiv:2106.06072 (Year: 2021).*

Md et al., "SiamGauss: Siamese region proposal network with Gaussian head for visual object tracking." Journal of Applied Remote Sensing 16.3 (2022): 036501-036501 (Year: 2022).*

Office Action mailed Jul. 2, 2025 in corresponding Korean Application No. 10-2022-0118562 with English translation.

Xue Yang et al., "Learning High-Precision Bounding Box for Rotated Object Detection via Kullback-Leibler Divergence", 35th Conference on Neural Information Processing Systems (NeurIPS 2021), Jun. 3, 2021, 14 pages.

* cited by examiner

SIAMESE REGION PROPOSAL OBJECT TRACKING

PRIORITY INFORMATION

This application claims the benefit of Korean Patent Application No. 10-2022-0118562, filed on Sep. 20, 2022, in the Korean Intellectual Property Office, the disclosure of which is incorporated herein by reference in its entirety.

FIELD OF THE INVENTION

The embodiments generally relate to devices, systems, methods, and instructions for tracking an object, and more particularly, to defining an area for tracking corresponding to an object for tracking in an image based on a Gaussian distribution model, and tracking the object based on a deep-learning model based on a neural network.

DESCRIPTION OF THE RELATED ART

Visual object tracking is a technology that predicts a position of an object in subsequent frames given the position of the object in a first frame. The visual object tracking is one of the technologies in the field of computer vision that can be widely applied to autonomous driving and surveillance.

Specifically, by applying artificial intelligence (AI) technology, being developed is object detection and identification technology from data for humans to identify using sensory and/or cognitive abilities, such as various electro-optical image sensor data and partially obscured object data in battlefield situations, and object recognition and tracking technologies using artificial neural networks are being researched. In addition thereto, mounted AI (Tiny AI) apparatuses are being developed to quickly apply the technologies. The AI-based object tracking algorithm may be applied to a space-based surveillance and reconnaissance system that obtains video information about a target area from space and transmits the video information to the ground in real time, forming, reading and identifying the target to execute military decisions, a system for collecting tactical reconnaissance video information that obtains day and night image information about a tactical target by mounting an imaging apparatus on a high-speed, high-mobility fighter jet, a reconnaissance unmanned aerial vehicle that performs target tracking and surveillance and reconnaissance missions by photographing a specific target and obtaining video information according to a planned mission, a guided weapon system that tracks a target in real time and a system for identifying ally forces and enemy forces based on video.

Most existing object tracking algorithms attempt to estimate accurate object boundaries by modeling a target object using an upright rectangle parallel to the axis of an image and using bounding box regression. For example, most neural network trackers using a region proposal network (RPN) apply technology to learn the bounding box prediction unit by adjusting a predefined anchor box or directly predicting the pixel offset of a bounding box.

However, the target object in actual video may not be rigid or may rotate in a direction that is not parallel to the axis of the image, and thus existing upright rectangular-based models that do not consider the direction of the object may be vulnerable to object transformation, rotation, or changes in shooting composition.

Recently, there has been an attempt to increase the accuracy of object tracking by introducing an object segmentation module into a tracking framework and performing pixel-level prediction. Related methods find a rotated bounding box from a predicted binary mask through post-processing. This is more effective in terms of precision than methods that only use upright bounding boxes, but pixel-level prediction requires a high computational burden and causes a decrease in performance speed due to additional post-processing. With regard thereto, prior arts KR10180170829B1, KR10200026298A and U.S. Ser. No. 11/227,179B2 may be referred to.

SUMMARY OF THE INVENTION

Accordingly, the present invention is directed to devices, systems, methods, and instructions for object tracking based on deep-learning that substantially obviate one or more problems due to limitations and disadvantages of the related art.

Fast object identification and tracking is necessary even in various battlefield environments with vision recognition used in battlefield situations, such as video-based identification and tracking, a surveillance and reconnaissance system, a guided weapon system and a firearm target detection system. In an urgent battlefield environment, there is high possibility of an object rotating or transforming due to the rapid movement of the imaging equipment itself or the rapid movement of the object that is being targeted. Thus, a rigid response thereto is necessary, high precision in identifying ally forces and enemy forces is necessary and embedment in the equipment of various tactical systems or weapon systems is required, and accordingly, lightweight computational hardware may be needed.

An aspect provides a method for object tracking by which an object is rigidly tracked within images even if the object moves within the images or the object is rotated or transformed (changing its shape) by recognizing the orientation of the object for tracking, and an electronic apparatus using the method.

Another aspect also provides a method of object tracking based on an object area model that is modeled for a rigid response to a change in shooting composition, a movement of an object, a rotation of the object or transformation of the object in order to overcome the problems of bounding box models in which an area of a target object is modeled by using the upright rectangle, and an electronic apparatus using the method.

Another aspect also provides a method of object tracking that reduces performance speed reduction and reduces computational burden, and an electronic apparatus using the method.

According to an aspect, there is provided a method of object tracking based on deep-learning performed in an electronic apparatus, the method including pre-training a model for object tracking based on pre-input learning data, receiving a target image of which at least one area contains an image corresponding an object for tracking and a search image of which at least one area contains an image corresponding the object for tracking, and obtaining information on area for tracking regarding to the area corresponding to the object for tracking in the search image by applying the model for object tracking, wherein the area corresponding to the object for tracking is defined by a Gaussian distribution model, and the information on area for tracking includes parameter values of a plurality of parameters based Gaussian distribution corresponding to the area corresponding to the object for tracking.

According to an example embodiment, the plurality of parameters may include at least parameters related to position coordinates of the Gaussian distribution, parameters related to a shape of the Gaussian distribution and parameters related to a rotation angle of the Gaussian distribution.

According to an example embodiment, the pre-training the model for object tracking may further include updating parameters corresponding to at least one layer included in the model for object tracking in a direction of minimizing a result value of a loss function, and the loss function may be set to indicate a difference between the information on area for tracking obtained by applying the model for object tracking and a ground truth included in the learning data.

According to an example embodiment, the loss function may be defined based on a Kullback-Leibler divergence value between Gaussian distribution corresponding to the information on area for tracking and Gaussian distribution corresponding to the ground truth.

According to an example embodiment, the model for object tracking may include an RPN including an area proposal module for obtaining candidate area information corresponding to the at least one area of the search image based on at least one convolution layer for obtaining a feature map from the target image and the search image and the feature maps, and a refining module including at least one fully connected layer for obtaining the information on area for tracking from the feature maps and the candidate area information obtained from the RPN.

According to an example embodiment, the RPN may include a Siamese-network structure including a first branch that receives the target image as an input and includes at least one convolution layer and a second branch that receives the search image as an input and includes at least one convolution layer that share parameters with at least one layer of the first branch, based on a cross-correlation operation performed based on a first feature map obtained from the at least one convolution layer of the first branch and a second feature map obtained from the at least one convolution layer of the second branch, the area proposal module may obtain a Gaussian feature map including information on a Gaussian area and a class feature map that contains information about a score corresponding to at least one anchor that is set in each of at least one area of the search image, and the method may further include obtaining candidate area information based on a score for each anchor identified based on the class feature map and the Gaussian feature map.

According to an example embodiment, the refining module may receive the candidate area information and the feature map obtained from the RPN as inputs, and obtain a feature map corresponding to a candidate area based on a rotated region of interest (ROI) aligning operation based on bilinear interpolation, and the refining module may be configured to obtain the information on area for tracking based on the feature map corresponding to the candidate area.

According to an example embodiment, the information on area for tracking corresponding to the object for tracking may include a plurality of parameter values for a plurality of areas and information about confidence corresponding to each of the plurality of areas, and the method may further include obtaining a weighted-mean value of the plurality of parameter vales based on the information about the confidence.

According to an example embodiment, the search image may include a first frame image included in first video containing a plurality of frames and a second frame image after the first frame image, and the method may further include obtaining first information on area for tracking based on the first frame image, obtaining second information on area for tracking based on the second frame image, and modifying parameter values related to a shape and parameter values related to a rotation angle of an area corresponding to the object for tracking in the second information on area for tracking based on the first information on area for tracking.

According to another aspect, there is provided an electronic apparatus that includes a memory and a processor, wherein the processor is configured to pre-train a model for object tracking based on pre-input learning data, receive a target image of which at least one area contains an image corresponding an object for tracking and a search image of which at least one area contains an image corresponding the object for tracking, and obtain information on area for tracking regarding to the area corresponding to the object for tracking in the search image by applying the model for object tracking, wherein the area corresponding to the object for tracking is defined by a Gaussian distribution model, and the information on area for tracking includes parameter values of a plurality of parameters based Gaussian distribution corresponding to the area corresponding to the object for tracking.

According to another aspect, there is provided a computer-readable non-transitory recording medium having a program for executing a method of object tracking based on deep-learning on a computer, wherein the method includes pre-training a model for object tracking based on pre-input learning data, receiving a target image of which at least one area contains an image corresponding an object for tracking and a search image of which at least one area contains an image corresponding the object for tracking, and obtaining information on area for tracking regarding to the area corresponding to the object for tracking in the search image by applying the model for object tracking, wherein the area corresponding to the object for tracking is defined by a Gaussian distribution model, and the information on area for tracking includes parameter values of a plurality of parameters based Gaussian distribution corresponding to the area corresponding to the object for tracking.

According to example embodiments, it is possible for an electronic apparatus to provide a method of rigid object tracking even with a rotation, a transformation and a movement of an object by defining an area corresponding to the object for tracking with a Gaussian distribution model.

According to example embodiments, it is possible to provide a method of object tracking that reduces computational burden and execution time since the method does not require binary mask creation or additional post-processing compared to object segmentation-based methods.

Furthermore, according to example embodiments, a Gaussian model may be universally applied to various tracking algorithms based on a deep neural network.

The effects achievable by the present disclosure are not limited to the effect mentioned above. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
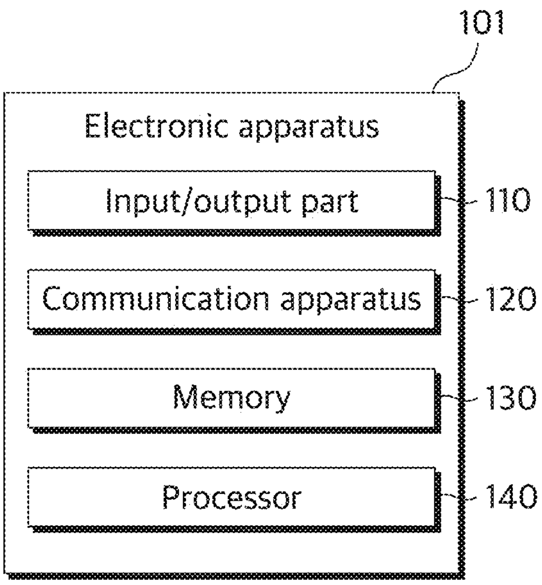
FIG. 1 is a diagram illustrating a configuration of an electronic apparatus for tracking an object according to an example embodiment.

The following example embodiments may be configured by combining components and features of various example embodiments in predetermined forms. Each of the components and features may be considered to be optional unless explicitly stated otherwise. Each of the components and features may be implemented in a form that is not combined with another component or feature. Alternatively, various example embodiments may be constructed by combining some of the components and the features. The sequence of operations described in various example embodiments may be changed. Some components or features of one example embodiment may be included in another example embodiment, or may be replaced with corresponding components or features of another example embodiment.

In descriptions to be given in conjunction with the accompanying drawings, processes or operations that may obscure the gist of various example embodiments are not described, and processes or operations that are apparent to those of ordinary skill in the art are also not described.

Throughout the specification, when a part is described as "comprising or including" a component, it does not exclude another component but may further include another component unless otherwise stated. Furthermore, terms such as " . . . unit," " . . . group," and " . . . module" described in the specification mean a unit that processes at least one function or operation, which may be implemented as hardware, software, or a combination thereof. Moreover, "a," "an," "one," "the," and similar terms thereto may be used in a sense including both singular and the plural forms in the context of describing various example embodiments (especially in the context of the attached claims) unless otherwise indicated herein or clearly contradicted by context.

Hereinafter, various example embodiments will be described in detail with reference to the accompanying drawings. The detailed description to be given below in conjunction with the accompanying drawings is intended to describe various example embodiments, and is not intended to represent the only embodiments.

Furthermore, specific terms used in various example embodiments are provided to help the understanding of the various example embodiments, and the use of these specific terms may be changed to other forms without departing from the technical spirit of the various example embodiments.

In this case, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

FIG. 1 is a diagram illustrating a configuration of an electronic apparatus 101 for tracking an object according to an example embodiment.

Referring to FIG. 1, a method of object tracking according to the example embodiment may be implemented in various types of apparatuses. For example, the method of object tracking may be implemented in the electronic apparatus 101. In other words, the electronic apparatus 101 may perform operations according to various example embodiments of the present disclosure. Meanwhile, the method of object tracking according to the example embodiments is not limited to the illustration of FIG. 1, and may be implemented in various electronic apparatuses and servers.

The electronic apparatus 101 according to the example embodiment may be an apparatus that performs wireless and wired communication with various external apparatuses and includes storage with large storage capacity. For example, the electronic apparatus 101 may be a cloud apparatus connected to one or more external apparatuses.

The electronic apparatus 101 according to the example embodiment may be an apparatus that is used by an individual user, such as a desktop PC, a tablet PC, a mobile terminal. In addition thereto, other electronic apparatuses that perform similar functions may be used as the electronic apparatus for tracking an object.

The electronic apparatus 101 for tracking an object according to the example embodiment may include various modules for object tracking operations. The modules included in the electronic apparatus 101 may be computer codes or one or more instructions implemented so that a physical apparatus (for example, the electronic apparatus 101) on which the method of object tracking is implemented (or included in the physical apparatus) can perform a specific operation. In other words, the physical apparatus on which the method of object tracking is implemented may store a plurality of modules in a memory in the form of computer codes, and when the plurality of modules stored in the memory are executed, the plurality of modules may cause the physical apparatus to perform designated operations corresponding to the plurality of modules.

Referring to FIG. 1, the electronic apparatus 101 may include an input/output part 110, a communication apparatus 120, a memory 130 and a processor 140.

The input/output part 110 may be various interfaces or connection ports that receive a user input or output information to a user. The input/output part 110 may include an input module and an output module, and the input module receives user input from the user. A user input may take various forms, including a key input, a touch input and a voice input. Examples of input modules that can receive such user inputs include traditional keypads, keyboards and mouses, as well as motion sensors that recognize user movements through a touch sensor that detects the user's touch, a microphone that receives voice signals, a camera that recognizes gestures through image recognition, a proximity sensor including at least one of a light sensor and an infrared sensor to detect user approach, an acceleration sensor and a gyro sensor, and various other types of input receiving parts that detect or receive user inputs. In the present disclosure, an input module may include at least one of the described input modules. Here, the touch sensor may be implemented as a piezoelectric or capacitive touch sensor that detects touch through a touch panel or touch film attached to a display panel, or an optical touch sensor that detects touch by an optical method. In addition, the input module may be implemented in the form of an input interface (a USB port, a PS/2 port and so on) that connects an external input apparatus that receives a user input instead of an apparatus that detects a user input itself. Additionally, the output module may output various information. The output module may include at least one of a display that outputs an image, a speaker that outputs sound, a haptic apparatus that generates vibration and various other types of output apparatuses. In addition, the output module may be implemented in the form of a port-type output interface that connects the individual output parts described above.

For example, the display-type output module may display text, still images and moving images. The display may include at least one of a liquid crystal display (LCD), a light emitting diode (LED) display, an organic light emitting diode (OLED) display, a flat panel display (FPD), a transparent display, a curved display, a flexible display, a 3D display, a holographic display, a projector and various other types of apparatuses that performs image output functions. This display may be in the form of a touch display integrated with the touch sensor of the input module.

The communication apparatus 120 may communicate with other apparatuses. Therefore, the electronic apparatus 101 may transmit and receive information with other apparatuses through the communication apparatus. For example, the electronic apparatus 101 and various external apparatuses may communicate with each other or with other apparatuses using a communication apparatus.

Here, communication, that is, transmitting and receiving data, may be accomplished wired or wirelessly. For the communication, the communication apparatus may be composed of a wired communication module that connects to the Internet through a local area network (LAN), a mobile communication module that connects a mobile communication network via a mobile communication base station and transmits and receives data, a short-range communication module that uses a wireless local area network (WLAN) communication method such as Wi-Fi or a wireless personal area network (WPAN) communication method such as Bluetooth or Zigbee, a satellite communication module using the global navigation satellite system (GNSS) such as the global positioning system (GPS) or a combination thereof.

The memory 130 may store various types of information. Memory can store data temporarily or semi-permanently. For example, the memory of the electronic apparatus may store data related to an operating system (OS) for driving the electronic apparatus 101, a program for generating data or Braille for hosting a website or an application (for example, an web application). Further, a described above, the memory may store modules in the form of computer code.

Examples of the memory 130 may include hard disk drive (HDD), solid state drive (SSD), flash memory, read-only memory (ROM) and random access memory (RAM). The memory may be provided as a built-in or removable type.

The processor 140 controls the overall operation of the electronic apparatus 101. For this, the processor 140 may perform computation and processing of various information and control operations of components of the electronic apparatus 101. For example, the processor 140 may execute a program or an application to perform the method of object tracking. The processor 140 may be implemented as a computer or similar apparatus using hardware, software or a combination thereof. In hardware, the processor 140 may be implemented in the form of an electronic circuit that processes electrical signals and performs a control function, and in software, the processor 140 may be implemented in the form of a program that drives the hardware processor 140. Meanwhile, in the following description, unless otherwise specified, the operation of the electronic apparatus 101 may be interpreted as being performed under the control of the processor 140. In other words, when modules implemented in the method of object tracking are executed, the modules may be interpreted as the processor 140 controlling the electronic apparatus 101 to perform the following operations.

In summary, various example embodiments may be implemented through various apparatuses. For example, various example embodiments may be implemented by hardware, firmware, software, or a combination thereof.

In the case of hardware implementation, methods according to various example embodiments may be implemented by at least one of application specific integrated circuits (ASICs), digital signal processors (DSPs), digital signal processing apparatuses (DSPDs), programmable logic apparatuses (PLDs), field programmable gate arrays (FPGAs), processors, controllers, microcontrollers, and microprocessors.

In the case of hardware implementation, methods according to various example embodiments may be implemented by various weapon systems or tactical systems including the electronic apparatus 101. For example, the electronic apparatus 101 may be embedded in various weapon apparatuses or tactical equipment included in surveillance and reconnaissance systems, target tracking systems, firearm target detection systems, enemy identification systems, unmanned surveillance and reconnaissance aircraft, and guided weapon systems, or the electronic apparatus 101 may be implemented in various electronic apparatuses that are communicatively connected to various weapon apparatuses or tactical equipment.

In the case of implementation by firmware or software, methods according to various example embodiments may be implemented in the form of modules, procedures, or functions that perform functions or operations described below. For example, software codes may be stored in a memory and run by a processor. The memory may be located inside or outside the processor, and may exchange data with the processor through the above-described parts.

Hereinafter, various example embodiments will be described in more detail based on the above technical ideas. The contents described above may be applied to various example embodiments described below. For example, operations, functions and terms that are not defined in various example embodiments described below may be performed and explained based on the content described above.

In the following description, various example embodiments will be described on the premise that the electronic apparatus 101 performs operations according to the method of object tracking, and according to the various example embodiments, the electronic apparatus 101 may transmit and receive information related to the operations of tracking an object with an external apparatus.

Figure 2:
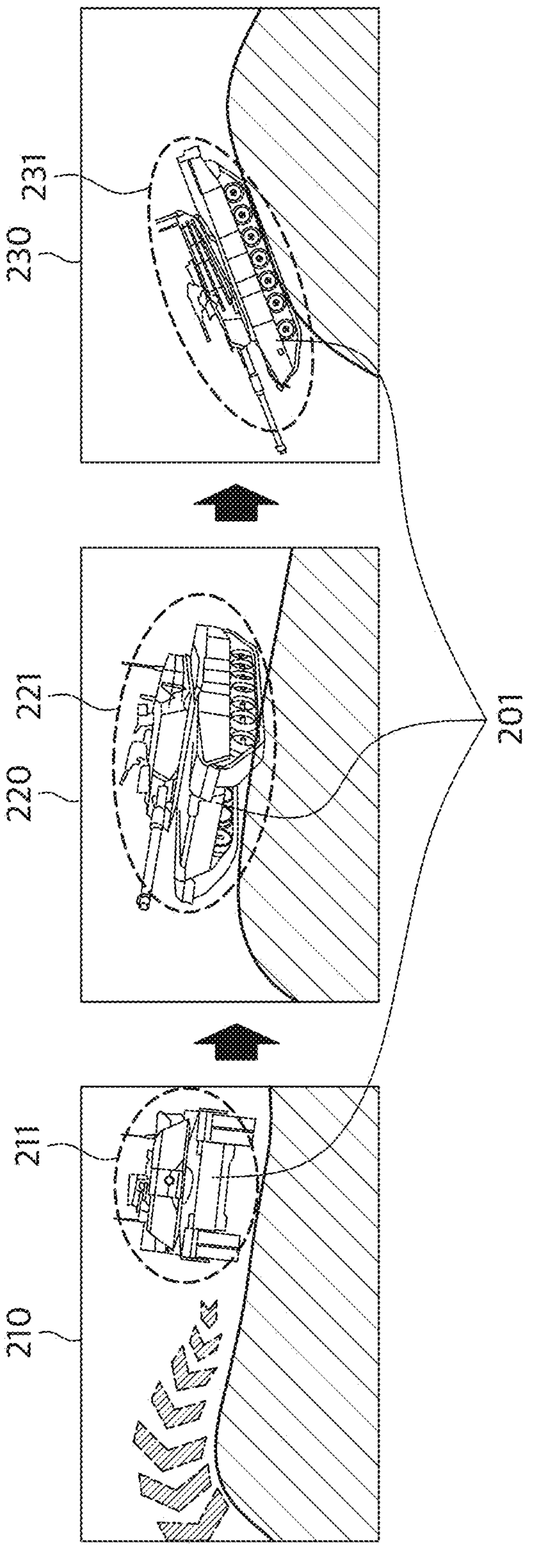
FIG. 2 illustrates a conceptual diagram of an electronic apparatus tracking an object in images according to an example embodiment.

FIG. 2 illustrates a conceptual diagram of an electronic apparatus tracking an object in images according to an example embodiment.

Referring to FIG. 2, the electronic apparatus 101 according to the example embodiment may obtain information about an area 211, an area 221 and an area 231 corresponding to an object 201 for tracking from a first image 210, a second image 220 and a third image 230.

In the example embodiment, the electronic apparatus 101 may receive one or more images 210, 220 and 230 as input. The one or more inputs may include one or more frame images in video including a plurality of frames. The electronic apparatus 101 may receive one or more frame images for each frame corresponding to a designated time interval, and may obtain information (for example, information on areas for tracking) about areas (for example, the area 211, the area 221 and the area 231 for tracking) corresponding to the object 201 for tracking corresponding to each of one or more frame images.

Referring to FIG. 2, the electronic apparatus 101 may receive each of the first image 210, the second image 220 and the third image 230 as an input, and each of the first image 210, the second image 220 and the third image 230 may be an image corresponding to a frame included in one video. The first image 210, the second image 220 and the third image 230 may be images corresponding to consecutive frames in the order, or may be a plurality of images obtained by the electronic apparatus 101 from the video based on a specific time interval. Alternatively, the first image 210, the second image 220 and the third image 230 may be a plurality of images obtained by the electronic apparatus 101 from the video based on a random time interval. The first image 210, the second image 220 and the third image 230 may be images obtained in chronological order from the video. For example, the electronic apparatus 101 may obtain a plurality of images in time order corresponding to frames. Each of the one or more images that the electronic apparatus 101 receives as input may include at least one area corresponding to the object 201 for tracking.

According to various example embodiments, the electronic apparatus 101 may obtain information on area for tracking about an area corresponding to the object for tracking in an input image using the model for object tracking. Referring to FIG. 2, the electronic apparatus 101 may receive the first image 210 as an input image and obtain information on the first area 211 corresponding to the object 201 for tracking by using the model for object tracking. In an example embodiment, the information on area for tracking obtained by the electronic apparatus 101 may include at least some of information about position, information about shape and information about rotation angle corresponding to at least some areas on the input images corresponding to the target for tracking. For example, referring to FIG. 2, the information on area for tracking about the first area may include at least some of information about position, information about shape and information about rotation angle of the first area 211 in the first image 210. The electronic apparatus 101 may obtain information on area for tracking corresponding to each input image. For example, referring to FIG. 2, the first area 211, the second area 221 and the third area 231 have different positions, shapes and rotation angles within the first image 210, the second image 220 and the third image 230, respectively. The electronic apparatus 101 may receive a target image including an image of the object 201 for tracking included in at least some areas of the input first image 210, the input second image 220 and the input third image 230 as separate inputs. Based on the target image and the first image 210, the second image 220 and the third image 230, the electronic apparatus 101 may obtain information about the area 211, the area 221 and the area 231 corresponding to the object 201 for tracking included in each of the first image 210, the second image 220 and the third image 230. Here, the first image 210, the second image 220 and the third image 230 may correspond to search images. In an example embodiment, the target image may be an image corresponding to the frame that appears first among a plurality of frame images selected as input images from the same video image. Referring to FIG. 2, the electronic apparatus 101 may separately receive an image containing the object 201 for tracking, or may input the first image 210, which is the leading frame among the first image 210, the second image 220 and the third image 230, as a target image into the model for object tracking.

Referring to FIG. 2, there may be changes in the location (for example, location coordinates), the shape and/or rotation angle of the area 211, the area 221 and the area 231 corresponding to the object 201 included in the first image 210, the second image 220 and the third image 230 which are input images. As shown in FIG. 2, the first area 211, the second area 221 and the third area 231 corresponding to the object 201 may be set as oval and/or rectangular areas, and referring to FIG. 2, it is illustrated that the center coordinate moves to the left, the ratio and/or length of the major axis/minor axis changes, and the rotation angle changes counterclockwise relative to the major axis.

In an example embodiment, the information on the area for tracking that the electronic apparatus 101 received may include at least some of parameter values to the location, parameter values related to the shape and parameter values related to the rotation angle of the area corresponding to the object 201 for tracking.

Figure 3:
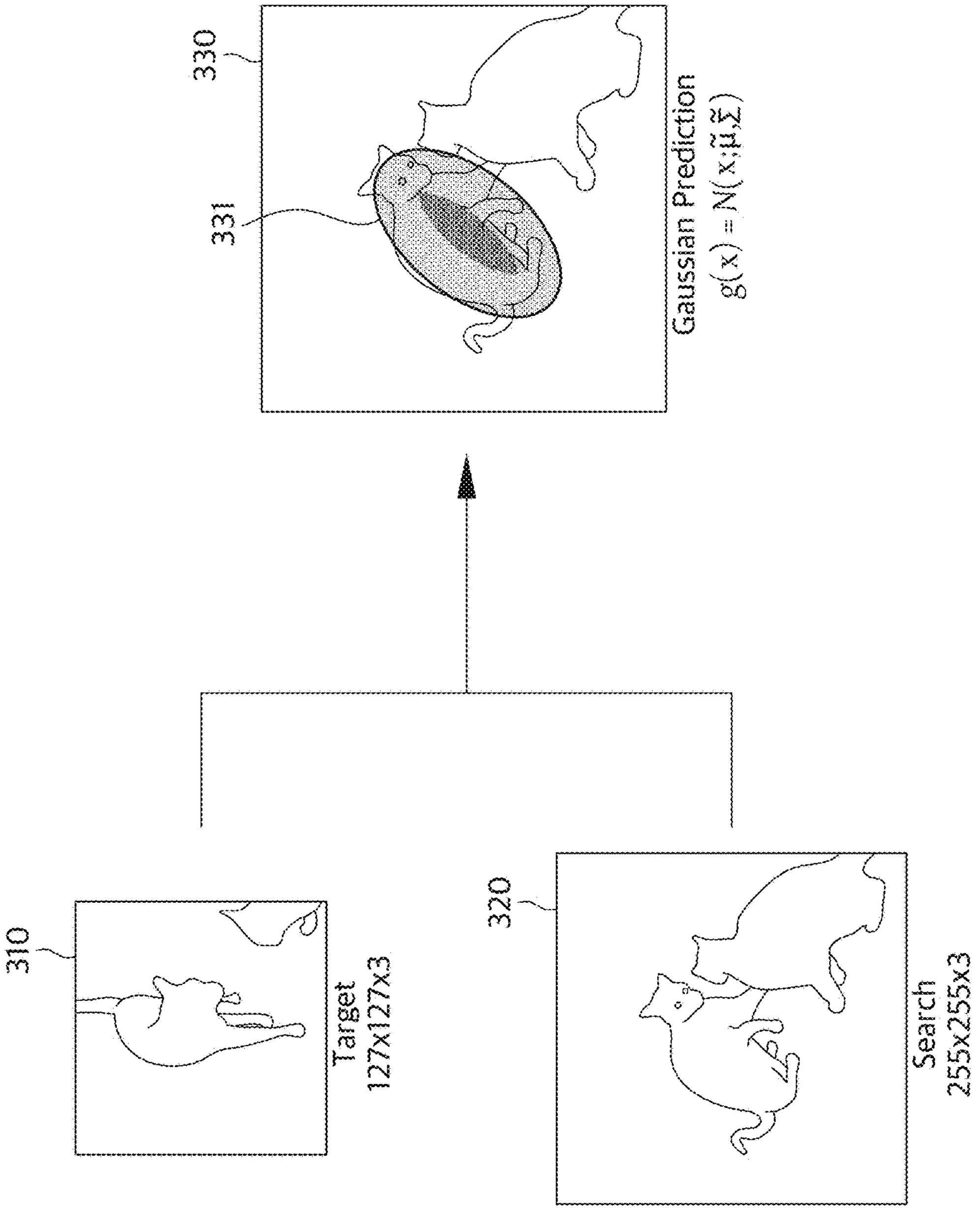
FIG. 3 illustrates input information and output information for an electronic apparatus to perform an object tracking method according to an example embodiment.

FIG. 3 illustrates input information and output information for an electronic apparatus to perform an object tracking method according to an example embodiment.

Figure 4:
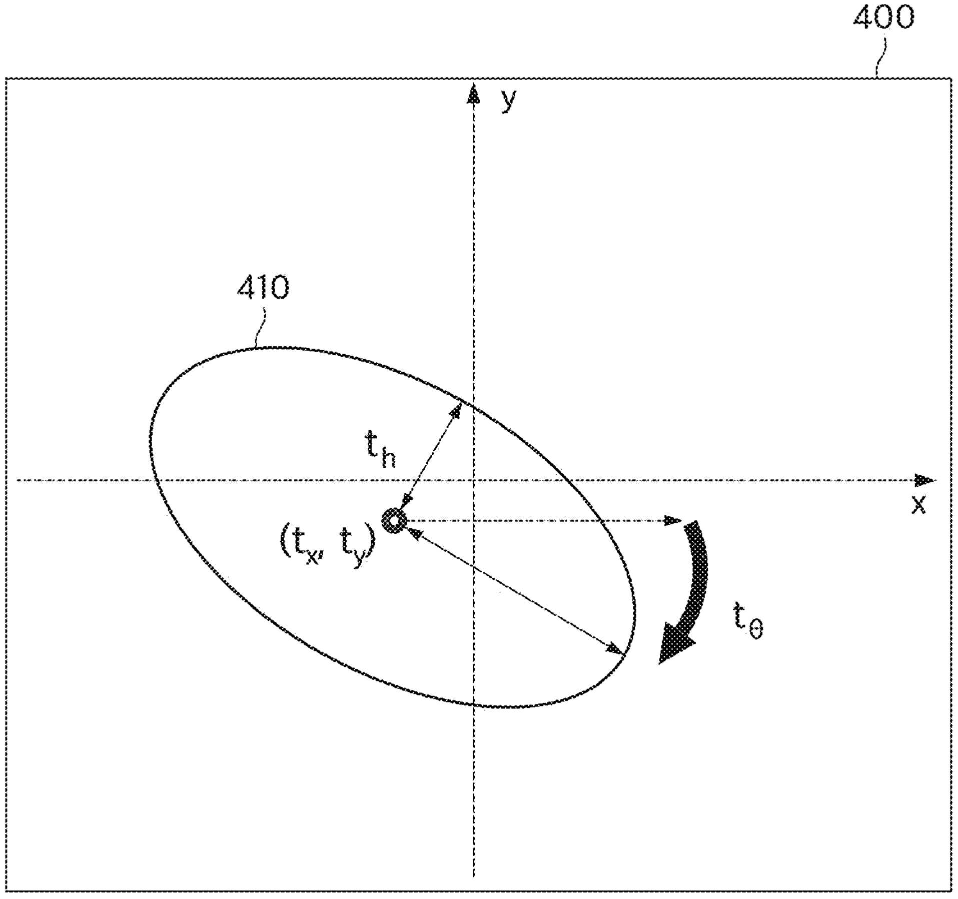
FIG. 4 illustrates an area defined by a Gaussian distribution model according to an example embodiment.

FIG. 4 illustrates an area defined by a Gaussian distribution model according to an example embodiment.

Referring to FIG. 3, the electronic apparatus 101 according to the example embodiment may receive a target image 310 and a search image 320 as inputs. In the example embodiments, the electronic apparatus 101 may receive the target image 310 in which at least one area contains an image corresponding to a target (for example, the object 201 for tracking in FIG. 2) and the search image 320 in which the object for tracking is searched as inputs to the model for object tracking.

Referring to FIG. 3, the electronic apparatus 101 according to the example embodiment may obtain information (for example, the information on area for tracking) about an area (for example, an area for tracking) corresponding to the object for tracking in the search image 320 as an output by using the model for object tracking. In an example embodiment, the information on area for tracking that is related to an area 331 for tracking may correspond to at least one area on a result image 330. Here, the result image 330 may be the same image as the search image 320 or another image including information about the areas 331 for tracking on the search image 320.

In an example embodiment, the target image 310 may be an image corresponding to a preceding frame among input images selected as inputs among a plurality of frames included in video. The video may include a plurality of frame images including at least the target image 310 and the search image 320. The electronic apparatus 101 may obtain one of the input images as the target image 310. For example, the electronic apparatus 101 may obtain, as the target image 310, an image cropped to a specific size to include an object that is set as a target (for example, the object 201 for tracking in FIG. 2) from the image of the most preceding frame.

In an example embodiment, the electronic apparatus 101 may crop or pad the target image 310 and/or the search image 320 to a specific size. For example, referring to FIG. 3, the electronic apparatus 101 may correspond to 127 pixels horizontally and vertically, and may receive the target image 310 as information including pixel values assigned to each pixel. Here, the pixel value corresponding to each pixel may be expressed as 3D value of red, green and blue, and this may be understood as the size of 127×127×3. A pixel value corresponding to color dimension of each of red, green and blue and each pixel may have a size from 0 to 255, but the pixel size and pixel value of the target image 310 are not limited thereto.

Referring to FIG. 4, it is identified that an area for tracking corresponding to the object for tracking is defined based on Gaussian distribution f(x) in an image (for example, a search image 400). Here, f(x) may be the area of the object previously defined as the ground truth of a model for object tracking, and the electronic apparatus 101 may receive ground truth information as at least part of the learning data. According to the example embodiment, the learning data includes image information. According to an example embodiment, the learning data may include one or more target images and search images. According to an example embodiment, augmentation may be operated for the learning data by the electronic apparatus 101. The electronic apparatus 101 may obtain as learning data an image corresponding to the area of a predetermined image that is input as the learning data. For example, the electronic apparatus 101 may obtain as learning data a second image corresponding to the area of the first image that is input as the learning data. According to an example embodiment, the electronic apparatus 101 may obtain the area of the first image as augmented learning data based on center coordinate information, horizontal length information and vertical length information. For example, the electronic apparatus 101 may identify a point corresponding to the center coordinate in the area of the first image based on the center coordinate information, and the electronic apparatus 101 may obtain an image as the second image centered on the identified point and that corresponds to a partial area on the first image having the horizontal length based on horizontal length information and the vertical length based on vertical length information. According to an example embodiment, the electronic apparatus 101 may augment learning data based on rotation angle information. For example, the electronic apparatus 101 may obtain a partial area of the first image as a second image, the second image having a center position corresponding to the center coordinate information, the horizontal length corresponding to the horizontal length information and the vertical length corresponding to the vertical length, and corresponding to the area rotated in response to the rotation angle information, based on the center coordinate information, the horizontal length information, the vertical length information and the rotation angle information. The electronic apparatus 101 may obtain a plurality of different images as learning data from the first image that is input as the learning data based on at least some of the center coordinate information, the horizontal length information, the vertical length information and the rotation angle information. The area for tracking may be defined by a Gaussian distribution model. Here, Gaussian distribution g(x) corresponding to the area 331 for tracking may be Gaussian distribution corresponding to the object area calculated by the electronic apparatus 101 using the model for object tracking in response to the search image 320. The Gaussian distribution f(x) of the ground truth may be expressed by Equation 1 and Equation 2 as follows.

$$f(x) = N(x; \mu, \Sigma) \quad \text{[Equation 1]}$$

$$\mu = (t_x, t_y) \text{ and } \sum = R(t_\theta)\begin{bmatrix} (t_w/2)^2 & 0 \\ 0 & (t_h/2)^2 \end{bmatrix} R(-t_\theta) \quad \text{[Equation 2]}$$

In Equation 1, μ and Σ represent the mean and covariance of the Gaussian distribution, respectively. R(•) represents a rotation matrix. Each of $t_x$, $t_y$, $t_w$, $t_h$ and $t_\theta$ indicates at least one parameter corresponding to Gaussian distribution f(x). The one or more parameters ($t_x$, $t_y$, $t_w$, $t_h$ and $t_\theta$) corresponding to the Gaussian distribution of the ground truth may correspond to parameters corresponding to the position, shape and/or rotation angle of the elliptical contour corresponding to the Gaussian distribution f(x). For example, ($t_x$, $t_y$) is the center coordinate within the search image 400 of an area 410 for tracking in the ground truth, and $t_w$ and $t_h$ indicate the length of the major and minor axes of the ellipse when the area 410 for tracking is expressed as an ellipse. Rotation angle $t_\theta$ may represent the angle rotated clockwise from the horizontal axis of the image. The electronic apparatus 101 may define a loss function expressed as Equation 5 below based on the difference between the Gaussian distribution g(x) for the object for tracking object obtained in response to the search image 320 (for example, information on area for tracking) and the Gaussian distribution (for example, ground truth distribution) f(x) corresponding to the ground truth. The electronic apparatus 101 may train the model for object tracking in the direction that minimizes a defined loss function value. Specific operations related to training the model for object tracking are described later.

Referring back to FIG. 3, in the example embodiment, the area 331 for tracking may be defined as parameter values of one or more parameters corresponding to the Gaussian distribution ("g(x)"). The electronic apparatus 101 may obtain information on area for tracking including a set of a plurality of parameter values related to the area 331 for tracking. Referring to FIG. 3, the area 331 for tracking is defined as a Gaussian distribution model corresponding to Equation 3 below, and the information on area for tracking may include parameter values corresponding to each of a plurality of parameters included in the Gaussian distribution model corresponding to Equation 4. Here, Gaussian distribution g(x) corresponding to the area 331 for tracking may be a Gaussian distribution corresponding to the area predicted by the electronic apparatus 101 using the model for object tracking in response to the search image 320.

$$g(x) = N\left(x; \tilde{\mu}, \tilde{\sum}\right) \quad \text{[Equation 3]}$$

$$\tilde{\mu} = \left(\tilde{t}_x, \tilde{t}_y\right) \text{ and } \tilde{\sum} = R(\tilde{t}_\theta)\begin{bmatrix} (\tilde{t}_w/2)^2 & 0 \\ 0 & (\tilde{t}_h/2)^2 \end{bmatrix} R(-\tilde{t}_\theta) \quad \text{[Equation 4]}$$

Here, $\tilde{\mu}$ and $\tilde{\Sigma}$ represent the mean and covariance of the Gaussian distribution, respectively. R(•) represents a rotation matrix. Each of $\tilde{t}_x$, $\tilde{t}_y$, $\tilde{t}_w$, $\tilde{t}_h$ and $\tilde{t}_\theta$ may indicate at least one parameter corresponding to Gaussian distribution g(x) predicted by the electronic apparatus 101. Information on area for tracking may include at least some of the parameters ($\tilde{t}_x$, $\tilde{t}_y$, $\tilde{t}_w$, $\tilde{t}_h$, $\tilde{t}_0$). The plurality of parameters ($\tilde{t}_x$, $\tilde{t}_y$, $\tilde{t}_w$, $\tilde{t}_h$, $\tilde{t}_\theta$) may correspond to parameters corresponding to the position, shape, and/or rotation angle of the elliptical contour corresponding to the Gaussian distribution g(x) predicted by the electronic apparatus 101. For example, ($\tilde{t}_x$, $\tilde{t}_y$) is the center coordinate within the search image 320 of the area 331 for tracking, and may be parameters regarding the location of the area 331 for tracking. $\tilde{t}_w$ and $\tilde{t}_h$ indicate the length of the major and minor axes of the ellipse when the area 331 for tracking is expressed as an ellipse, and may be parameters related to the shape of the area 331 for tracking. The rotation angle $\tilde{t}_\theta$ represents the angle rotated clockwise from the horizontal axis of the area 331 for tracking, and may be a parameter regarding the rotation angle of the area 331 for tracking. In other words, the electronic apparatus 101 may effectively include the orientation of the object in the model for object tracking by expressing the center coordinates and the object area (shape) of the object for tracking as the mean and covariance of 2D Gaussian distribution based on the parameters. The parameters corresponding to the information on area for tracking may include at least parameters regarding the shape of the area for tracking and parameters regarding the rotation angle of the area for tracking. Meanwhile, the plurality of parameters ($\tilde{t}_x$, $\tilde{t}_y$, $\tilde{t}_w$, $\tilde{t}_\theta$, $\tilde{t}_\theta$) may be predicted values that are obtained by refining 5D vectors $d_x$, $d_y$, $d_w$, $d_h$ and $d_\theta$ that are output from the RPN described later and by operating inverse operation on the refinement of parameters $d'_x$, $d'_y$, $d'_w$, $d'_h$ and $d'_\theta$ related to a final area for tracking by Equation 7, which will be described later. The output and refinement of RPN, and Equation 7 will be described later.

$$L_{gauss} = D_{KL}(f\|g) = \quad \text{[Equation 5]}$$

$$1/2\left[\log\frac{|\tilde{\sum}|}{|\sum|} - d + tr\left(\tilde{\sum}^{-1}\sum\right) + (\tilde{\mu}-\mu)^T\tilde{\sum}^{-1}(\tilde{\mu}-\mu)\right]$$

Figure 5:
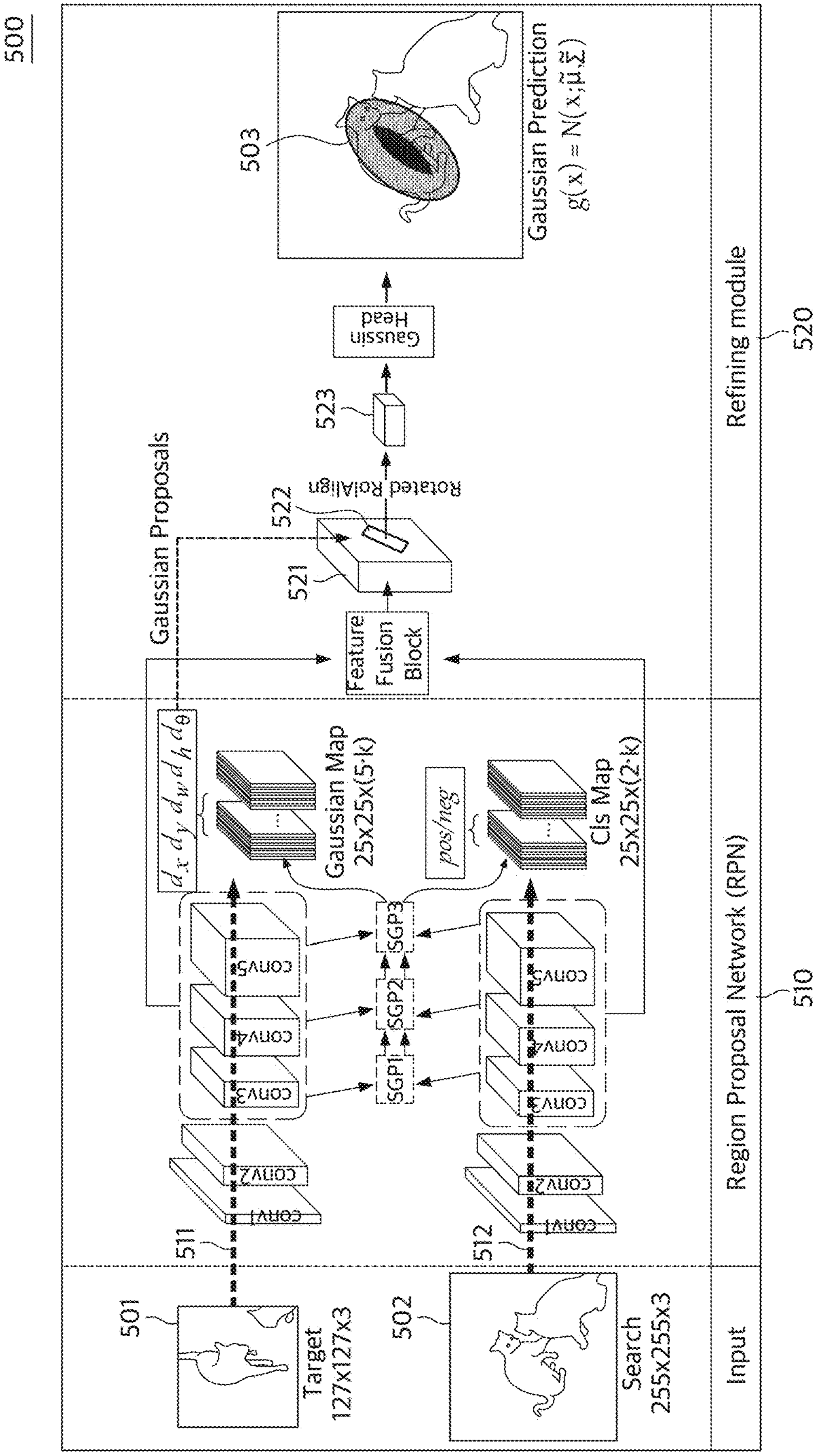
FIG. 5 illustrates a configuration of an object tracking model according to an example embodiment.

Referring to FIG. 5, loss function $L_{gauss}$ may be defined to use information about the divergence between f(x) and g(x). For example, the divergence may be defined as the Kullback-Leibler divergence between f(x) and g(x). In Equation 5, d may indicate the dimension of the distribution, and in the case of the model for object tracking, which uses 2D images to track an object, a loss function may be defined by assigning the value of d=2.

FIG. 5 illustrates a configuration of an object tracking model according to an example embodiment.

Figure 6:
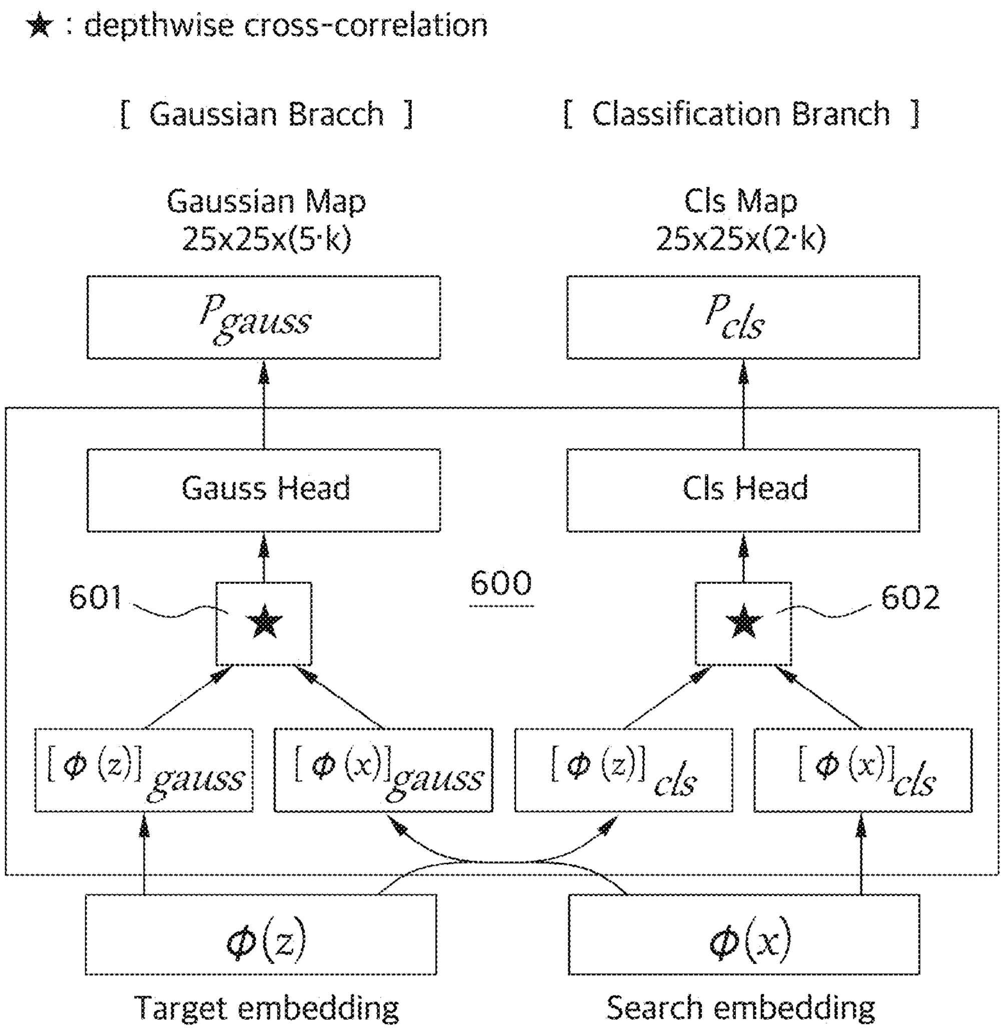
FIG. 6 illustrates an area proposal module according to an example embodiment.

FIG. 6 illustrates an area proposal module according to an example embodiment.

Referring to FIG. 5, a model 500 for object tracking may be expressed as a combination of functional modules including one or more instructions stored and implemented in the memory 130 of the electronic apparatus 101. Referring to FIG. 5, the model 500 for object tracking may include an RPN 510 and a refining module 520.

According to various example embodiments, the electronic apparatus 101 may input received input images (for example, a target image 501 and a search image 502) as input data into the model 500 for object tracking, and obtain information on an area 503 for tracking corresponding to the object. The information on area for tracking may include parameter values of one or more parameters corresponding to Gaussian distribution g(x).

According to various example embodiments, the model 500 for object tracking may include the RPN 510 including at least one neural network. According to an example embodiment, the electronic apparatus 101 may receive the target image 501 and the search image 502 as input through the RPN 510, and may obtain output data that will be input data of the refining module 520. As output data, the RPN 510 may obtain a feature map (feature) based on candidate area information corresponding to at least one area of the search image 502 and input data.

According to various example embodiments, the RPN 510 may include one or more convolution layers. The convolution layer may include a tensor defined by one or more filters to perform a convolution operation in response to input data. In an example embodiment, the RPN 510 may include a plurality of branches, each of which includes one or more convolution layers. A first branch 511 may receive the target image 501 and obtain a first feature map by passing the target image 501 through one or more convolution layers. A second branch 512 may receive the search image 502 and obtain a second feature map by passing the search image 502 through one or more convolution layers. In an example embodiment, in the RPN 510, one or more convolution layers included in each of the first branch 511 and the second branch 512 may have the same parameters of the corresponding layers. For example, referring to FIG. 5, each of the first branch 511 and the second branch 512 includes a first convolution layer (conv1), a second convolution layer (conv2), a third convolution layer (conv3), a fourth convolution layer (conv4) and a fifth convolution layer (conv5). Further referring to FIG. 5, layers corresponding to each other, for example, the third convolution layer (conv3) of the first branch 511 and the convolution layer (conv3) of the second branch 512 may share the same parameters. The size and/or number of convolution layers included in each branch may have various values. For example, the RPN 510 may include a Siamese-network including a first branch and a second branch in which at least one corresponding inter-layer parameter is shared.

Candidate area information may be obtained based on one or more anchors arranged on the search image 502. Anchors are arranged at a plurality of designated coordinates of the search image 502, and may have a dimension defined by k types of shape and rotation angle information per the same coordinate. For example, referring to FIG. 5, 25×25×k anchors may be set per search image 502. Here, 25×25 may refer to the number of center coordinates defined as being arranged in each 2D area of the image, and may indicate the number of anchors arranged in 25 rows and 25 columns in the horizontal and vertical directions, that is, 2D area (size) information. The number of horizontal/vertical arrays of anchors may each have a value different from the above 25. The RPN 510 may obtain information about the confidence of each area of the search image 502 based on the anchors. For example, classification information with a 2D class may be assigned to each anchor. A 2D class is a class that has a positive (pos) or negative (neg) value corresponding to each anchor. The 2D class may be set to have a "pos" value if the anchor corresponding to the coordinates of an area corresponds to the area 503 for tracking, and to have a "neg" value if the anchor corresponding to the coordinates of an area does not correspond to the area 503 for tracking. A class value may be defined as a score, for example. In other words, based on the class value, a score corresponding to whether the anchor corresponding to each area is true or false may be identified. The RPN 510 may obtain a class feature map (Cls Map) by passing the target image 501 and the search image 502 using one or more convolution layers, and based on the class feature map (Cls Map), a confidence score corresponding to at least one anchor that is set in each area of the search image 502 may be identified by the class feature map (Cls Map). Based on class values corresponding to one or more anchors, the RPN 510 may identify information about the scores of the corresponding anchors. Candidate area information may include score information corresponding to each anchor, that is, confidence information, identified based on the class value corresponding to each of the one or more anchors. The class value has 2D information of "pos" or "neg," and thus the class feature map may correspond to a feature map with a total size of 25×25×(2k) according to the total area, k dimensions corresponding to combinations of k shapes and rotation angles, and 2 dimensions corresponding to class values. Here, "2k" is the number of dimensions (depth), and "2k" is the total dimension of the feature map based on a combination of 2D classes and k shapes and rotation angles. 25×25 may refer to the area of a 2D anchor array.

The candidate area information may include parameter values of Gaussian distribution corresponding to one or more anchors. In an example embodiment, the dimension defined by the k shape and rotation angle information defined for each anchor may correspond to one or more parameters corresponding to the Gaussian distribution. For example, an anchor with k dimensions may indicate that there are k combinations of various shapes and rotation angles of the Gaussian distribution area. Here, each anchor may correspond to five parameters, each parameter information about position coordinates, major/minor axis, and rotation angle. The RPN 510 may obtain a Gaussian feature map (Gaussian Map) by passing the target image 501 and the search image 502 using one or more convolution layers. The RPN 510 may obtain candidate area information for proposing a candidate area based on the Gaussian feature map (Gaussian Map) and confidence information corresponding to each anchor. The candidate area information may include one or more parameters corresponding to the Gaussian distribution of the candidate area. The candidate area may include information about the parameters of the Gaussian distribution selected based on the confidence information. For example, when a specific number of anchors are selected in order of high confidence based on the class feature map (Cls Map), the candidate area information may include a parameter set of Gaussian distribution corresponding to each selected anchor. The Gaussian feature map (Gaussian Map) may correspond to a feature map with a total size of 25×25×(5k) according to the total area, k dimensions corresponding to combinations of k shapes and rotation angles, and 5 dimensions corresponding to parameter types. Here, "5k" is the number of dimensions (depth), and is the total dimension of the feature map based on a combination of 5D parameter types and k shapes and rotation angles. 25×25 may refer to the area of a 2D anchor array.

In an example embodiment, the RPN 510 may obtain candidate area information including one or more parameters and confidence information corresponding to the Gaussian distribution of each selected anchor in response to the anchor selected based on confidence information for each anchor.

The RPN 510 may obtain a class feature map (Cls Map) and a Gaussian feature map (Gaussian Map) based on one or more feature maps obtained from the first branch 511 and the second branch 512. In an example embodiment, the RPN 510 may include one or more area proposal modules (SGP1, SGP2 and SGP3). Each of the one or more area proposal modules may obtain a class feature map (Cls Map) and a Gaussian map (Gaussian Map) based on a first feature map obtained from the first branch 511 and a second feature map obtained from the second branch 512. Based on the obtained class feature map (Cls Map) and Gaussian map (Gaussian Map), the area proposal module may obtain one or more parameter values corresponding to one or more parameters of the Gaussian distribution through the same operation as the method described above, and obtain candidate area information including confidence information of the area corresponding to the Gaussian distribution. Here, the area proposal module is a module that corresponds to the Siamese Gaussian proposal (SGP) module.

Referring to FIG. 6, identified are the operations that each of one or more area proposal modules included in the RPN 510 according to the example embodiment obtains candidate area information. An area proposal module 600 may obtain target embedding $\varphi(z)$ and search embedding $\varphi(x)$ as input. The target embedding may be data corresponding to a feature map (for example, the first feature map) obtained by passing the target image 501 through one or more convolution layers of the first branch 511. The search embedding may be data corresponding to a feature map (for example, a second feature map) obtained by passing the search image 502 through one or more convolution layers of the second branch 512. The area proposal module 600 may obtain a Gaussian feature map (Gaussian Map, $P_{gauss}$) based on the result of depthwise cross-correlation (first cross-correlation 601) of the target embedding and the search embedding. Further, the area proposal module 600 may obtain a class feature map (Cls Map, $P_{cls}$) based on the result of depthwise cross-correlation (second cross-correlation 602) of the target embedding and the search embedding.

Referring to FIG. 6, the area proposal module 600 illustrated in FIG. 6 may represent one of the plurality of area proposal modules (SGP1, SGP2 and SGP3) illustrated in FIG. 5. The area proposal module 600 may branch into two branches. One branch may obtain a feature map [$\varphi(z)_{gauss}$] generated through a convolution layer for the target embedding $\varphi(z)$ and a feature map [$\varphi(x)_{gauss}$] generated through a convolution layer for the search embedding $\varphi(x)$. Here, the convolution layer may have a size of 1×1. Further, the other branch may obtain a feature map [φ(z)cis] generated through a convolution layer for the target embedding $\varphi(z)$ and a feature map [φ(x)cis] generated through a convolution layer for the search embedding $\varphi(x)$. Here, the convolution layer may have a size of 1×1. The area proposal module 600 may generate across-correlation feature map that is generated through the first cross-correlation 601 of the feature map [$\varphi(z)_{gauss}$] and the feature map [$\varphi(x)_{gauss}$], and generate the Gaussian feature map ($P_{gauss}$, Gaussian Map) passing through a Gauss head network (Gauss Head) that includes one or more convolution layers and one or more fully connected layers. The area proposal module 600 may generate a cross-correlation feature map generated by performing the second cross-correlation 602 on the feature map [φ(z)cis] and the feature map [φ(x)cis], and may generate the class feature map ($P_{cls}$, Cls Map) by passing through a class head network (Cls Head) that includes one or more convolution layers and one or more fully-connected layers. The first cross-correlation 601 and the second cross-correlation 602 through which the area proposal module 600 generates the Gaussian feature map ($P_{gauss}$) and the class feature map ($P_{cls}$) may be expressed as Equation 6 below.

$$P_{gauss}^{25\times25\times5k} = [\phi(z)]_{gauss}\star[\phi(x)]_{gauss} \text{ and } P_{cls}^{25\times25\times2k} = [\phi(z)]_{cls}\star[\phi(x)]_{cls} \quad \text{[Equation 6]}$$

Here in Equation 6, *(star) indicates cross-correlation operation, and k indicates the type (dimension) of the anchor. The area proposal module (SGP) may obtain information about the confidence corresponding to each position of the anchor based on the class feature map as at least part of the candidate area information. Based on the Gaussian feature map, the area proposal module (SGP) may obtain five parameter values corresponding to the Gaussian distribution area, that is, 5-dimensional vectors ($d_x$, $d_y$, $d_w$, $d_h$ and $d_\theta$) as at least part of the candidate area information. The obtained 5D vectors ($d_x$, $d_y$, $d_w$, $d_h$ and $d_\theta$) may include parameter values related to the parameters defining the Gaussian distribution g(x). For example, based on each parameter value of the 5D vectors ($d_x$, $d_y$, $d_w$, $d_h$ and $d_\theta$), there may be conversion to 5D vectors ($\tilde{t}_x$, $\tilde{t}_y$, $\tilde{t}_w$, $\tilde{t}_h$, $\tilde{t}_\theta$) including parameter values that can be used to define the area corresponding to the Gaussian distribution on the actual image.

In an example embodiment, each parameter value included in the 5D vectors ($d_x$, $d_y$, $d_w$, $d_h$ and $d_\theta$) obtained based on the Gaussian feature map may be defined by normalized parameter values based on an anchor and the ground truth. The output 5D vectors may be expressed as Equation 7 below.

$$d_x = (t_x - a_x)/a_w,\ d_y = (t_y - a_y)/a_h, \quad \text{[Equation 7]}$$
$$d_w = \log(t_w/a_w),\ d_h = \log(t_h/a_h),$$
$$d_\theta = t_\theta - a_\theta$$

Here, $a_x$, $a_y$, $a_w$, $a_h$ and $a_\theta$ refer to each parameter element corresponding to the Gaussian distribution of the anchor, and $t_x$, $t_y$, $t_w$, $t_h$ and $t_\theta$ may constitute the ground truth. In an example embodiment, the electronic apparatus 101 may obtain 5D parameters ($\tilde{t}_x$, $\tilde{t}_y$, $\tilde{t}_w$, $\tilde{t}_h$, $\tilde{t}_\theta$) based on the output 5D vectors ($d_x$, $d_y$, $d_w$, $d_h$ and $d_\theta$) and parameter values ($a_x$, $a_y$, $a_w$, $a_h$ and $a_\theta$) corresponding to the selected anchor and Equation 7. The electronic apparatus 101 may identify the predicted Gaussian distribution g(x) based on the obtained parameters ($\tilde{t}_x$, $\tilde{t}_y$, $\tilde{t}_w$, $\tilde{t}_h$, $\tilde{t}_\theta$). Here, Equation 7 describes the generalized equation, and the parameter values ($d'_x$, $d'_y$, $d'_w$, $d'_h$ and $d'_\theta$) output through the refining module that is described later in Equation 7 may be applied instead of $d_x$, $d_y$, $d_w$, $d_h$ and $d_\theta$, and predicted values ($\tilde{t}_x$, $\tilde{t}_y$, $\tilde{t}_w$, $\tilde{t}_h$, $\tilde{t}_\theta$) may be applied to Equation 7 instead of the ground truth ($t_x$, $t_y$, $t_w$, $t_h$ and $t_\theta$).

In an example embodiment, the RPN 510 may obtain the final Gaussian feature map and the final class feature map based on multiple Gaussian feature maps and multiple class feature maps obtained from each of the one or more area proposal modules (SGP1, SGP2 and SGP3). Referring to FIG. 5, the first area proposal module (SGP1) may obtain a first Gaussian feature map ($P_{gauss}$, 1) based on the first cross-correlation 601 corresponding to the first feature map obtained from the third convolution layer (conv3) of the first branch 511 and obtain a first class feature map ($P_{cls}$, 1) and based on the second cross-correlation 602 of the second feature map that is corresponding to the first feature map and obtained from the third convolution layer (conv3) of the second branch 512. Likewise, the second area proposal module (SGP2) may obtain a second Gaussian feature map ($P_{gauss}$, 2) based on the first cross-correlation 601 corresponding to a third feature map obtained from the fourth convolution layer (conv4) of the first branch 511 and obtain a second class feature map ($P_{cls}$, 2) based on the second cross-correlation 602 of a fourth map that is corresponding to the third map and obtained from the fourth convolution layer (conv4) of the second branch 512. Further, the third area proposal module (SGP3) may obtain a third class feature map ($P_{cls}$, 3) and a third Gaussian feature map ($P_{gauss}$, 3) based on each of the first cross-correlation 601 and the second cross-correlation 602 of a fifth feature map obtained from the fifth convolution layer (conv5) and a sixth feature map. The RPN may obtain the final Gaussian feature map ($P_{gauss\text{-}all}$) and the final class feature map ($P_{cls\text{-}all}$). In an example embodiment, the final Gaussian feature map and the final class feature map may be generated based on the fusion weighted average of multiple feature maps, expressed as Equation 8 below.

$$P_{gauss-all}^{25\times25\times5k}=\sum_{l=1}^{3}\alpha_l P_{gauss,l} \text{ and } P_{cls-all}^{25\times25\times2k}=\sum_{l=1}^{3}\beta_l P_{cls,l} \quad \text{[Equation 8]}$$

Here, $\alpha_1$ and $\beta_1$ represent the fusion weight of the lth layer, respectively. $\alpha_1$ and $\beta_1$ may be trained offline with the RPN 510. Based on the final class feature map ($P_{cls-all}$) obtained in this way, the RPN 510 may select the most reliable anchor as a candidate area, and based on the final Gaussian feature map ($P_{gauss-all}$) corresponding to the anchor, the RPN 510 may include a plurality of calculated parameter values in candidate area information and input the parameter values to the refining module 520.

Referring to FIG. 5, the refining module 520 may receive the outputs of the RPN 510 as input, and may obtain a ROI feature map 523 corresponding to a candidate area 522 based on a rotated ROI aligning operation (Rotated ROI Align). The outputs of the RPN 510 may include a first feature map obtained from the first branch 511, a second feature map obtained from the second branch 512 and candidate area information (Gaussian Proposals) corresponding to one or more candidate areas. Here, the first feature map and the second feature map are generated as a single feature map 521 fused in a fusion module (Feature Fusion Block) of the refining module 520. The refining module 520 may generate the ROI feature map 523 by performing a rotated-ROI aligning operation based on the single fused feature map 521 and the candidate area information (Gaussian Proposals). The fusion model (Feature Fusion Block) may fuse feature maps obtained from one or more convolution layers included in the first branch 511 and the second branch 512. For example, generated may be the feature map 521 by generating an nth feature map by fusing feature maps obtained from each nth convolution layer in each branch with each other based on cross-correlation operation and finally fusing the nth feature map and an mth feature map by taking a weighted mean similar to Equation 8. Alternatively, the fused feature map 521 may be generated by fusing a feature map generated by first taking the weighted mean similar to Equation 8 of multiple feature maps obtained from each convolution layer of the first branch and a feature map generated by taking the same weighted mean method from the second branch, based on the cross-correlation operation.

The refining module 520 may generate a feature map corresponding to the candidate area proposed from the area proposal modules (SGP1, SGP2 and SGP3) of the RPN 510, that is, a ROI. Here, the candidate area information regarding the proposed candidate area may be candidate area information generated based on any one of the area proposal modules illustrated in FIG. 5. Or, the candidate area information regarding the proposed candidate area may be candidate area information generated based on the result of fusing feature maps generated from multiple area proposal modules, as illustrated in Equation 8 above. Here, the total number of area proposal modules (SGP), and the type and number of convolution layers that will receive feature maps from the first branch 511 and the second branch 512 may be implemented in various example embodiments. In an example embodiment, the ROI feature map 523 generated based on the rotated ROI aligning operation may have a size of 4×4. The refining module 520 may pass the ROI feature map 523 through the Gaussian head that is included in the refining module 520 and includes at least one convolution layer and at least one fully connected layer, and finally output the refined Gaussian prediction, g(x). Here, the Gaussian head may include two fully connected layers of 512 dimensions. The final output information on area for tracking may include normalized 5D vectors ($d'_x$, $d'_y$, $d'_w$, $d'_h$ and $d'_\theta$). Here, the finally output information on area for tracking may include $d'_x$, $d'_y$, $d'_w$, $d'_h$ and $d'_\theta$, which are parameter values for the final area 503 for tracking and the values ($d'_x$, $d'_y$, $d'_w$, $d'_h$ and $d'_\theta$) are from the operation in which the 5D vectors ($d_x$, $d_y$, $d_w$, $d_h$ and $d_\theta$) included in the candidate area information regarding the candidate area proposed from the RPN 510 are refined in the refining module 520 using the candidate area as the ROI. In an example embodiment, the electronic apparatus 101 may obtain the final output parameter values ($d'_x$, $d'_y$, $d'_w$, $d'_h$ and $d'_\theta$), parameter values ($a_x$, $a_y$, $a_w$, $a_h$ and $a_\theta$) corresponding to the selected anchor and 5D parameters ($\tilde{t}_x$, $\tilde{t}_y$, $\tilde{t}_w$, $\tilde{t}_h$, $\tilde{t}_\theta$) based on Equation 7. The electronic apparatus 101 may identify the Gaussian distribution g(x) predicted based on the obtained parameters ($\tilde{t}_x$, $\tilde{t}_y$, $\tilde{t}_w$, $\tilde{t}_h$, $\tilde{t}_\theta$).

Figure 7:
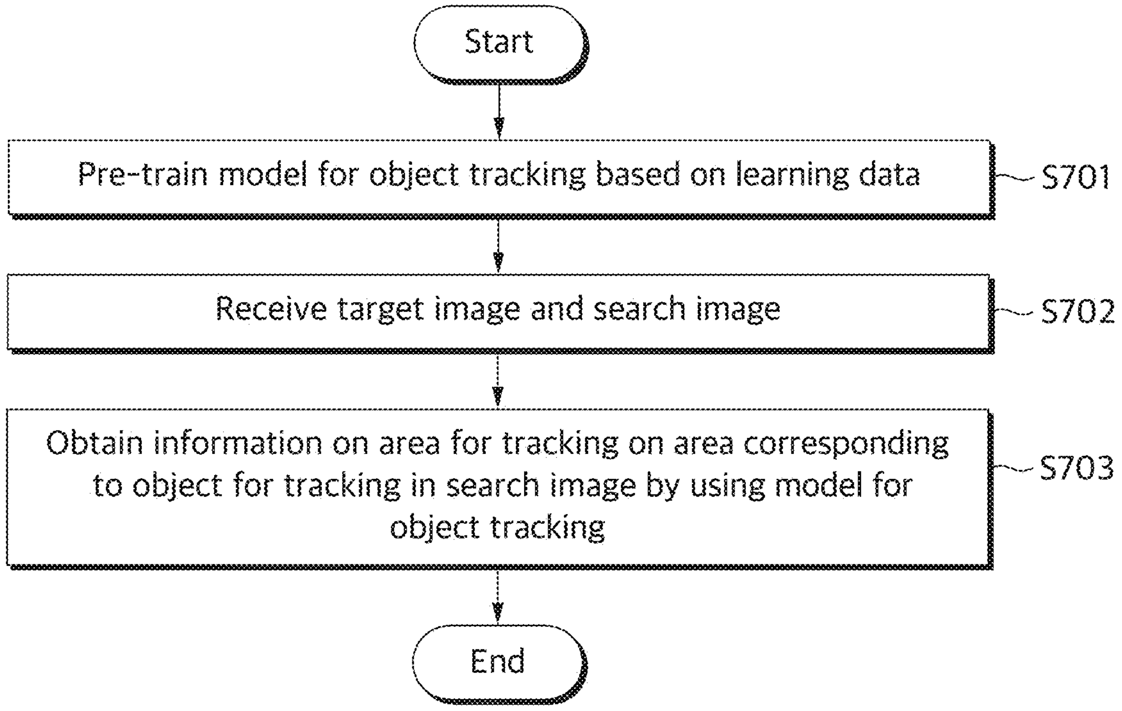
FIG. 7 is a flowchart of operations in which an electronic apparatus tracks an object according to an example embodiment.

FIG. 7 is a flowchart of operations in which an electronic apparatus tracks an object according to an example embodiment.

In operation S701, the electronic apparatus 101 may pre-train a model for object tracking based on learning data. The pre-training may be performed based on the difference between the information on area for tracking calculated by inputting a target image and a search image into the model for object tracking, and the ground truth labeled in the search image. Here, information about the ground truth, the target image input for learning and search images may correspond to the learning data.

In an example embodiment, the electronic apparatus 101 may train the model for object tracking based on a loss function. According to an example embodiment, the model for object tracking may be trained in the direction that minimizes a loss function value.

According to an example embodiment, the electronic apparatus 101 may define a loss function based on the outputs of the RPN 510 and the final output of the model 500 for object tracking. For example, the electronic apparatus 101 may define a loss function (for example, a first Gauss loss function, $L_{gauss-rpn}$) for the difference from the ground truth based on information about parameter values of the Gaussian distribution corresponding to the candidate area obtained from the RPN 510. Further, the electronic apparatus 101 may define a loss function (for example, a second Gauss loss function, $L_{gauss-refine}$) for the difference from the ground truth based on information about the parameter values of the Gaussian distribution corresponding to the final area for tracking generated through the refining module 520, and the electronic apparatus 101 may define an total loss function based on values of the first Gauss loss function and the second Gauss loss function. In an example embodiment, the total loss function may be defined through a weighted mean based on weight parameters corresponding to each of the first Gauss loss function and the second Gauss loss function. In an example embodiment, the electronic apparatus 101 may define a class loss function ($L_{cls}$) based on class classification as the final loss function. The class loss function may correspond to a cross entropy loss function for the target binary classification defined based on a confidence score. The electronic apparatus 101 may define the total loss function expressed as Equation 9 below based on the class loss function, the first Gauss loss function and the second Gauss loss function.

$$L = L_{cls} + \lambda_1 L_{gauss-rpn} + \lambda_2 L_{gauss-refine} \quad \text{[Equation 9]}$$

Here, L is the total loss function, $L_{cls}$ is the class loss function, $L_{gauss-rpn}$ is the first Gauss loss function and $L_{gauss-refine}$ is the second Gauss loss function. $\lambda_1$ and $\lambda_2$ may be weight parameters for balancing distribution matching between loss functions, respectively. The weight parameters may be trained from the electronic apparatus 101, or may be predetermined based on specified settings. Here, the first Gauss loss function is a loss function defined as the Kullback-Leibler divergence described in Equation 5. The first Gauss loss function may be defined as the divergence between the Gaussian distribution corresponding to the candidate area proposed in the RPN 510 and the Gaussian distribution corresponding to the ground truth. The second Gauss loss function is a loss function defined as Kullback-Leibler divergence described in Equation 5. The second Gauss loss function may be defined as the divergence between the Gaussian distribution corresponding to the final area 503 for tracking proposed in the entire model 500 for object tracking and the Gaussian distribution corresponding to the ground truth.

In operation S702, the electronic apparatus 101 may receive a target image and a search image, and in operation S703, the electronic apparatus 101 may obtain information on area for tracking by inputting each received image into the model for object tracking trained in operation S701.

Figure 8:
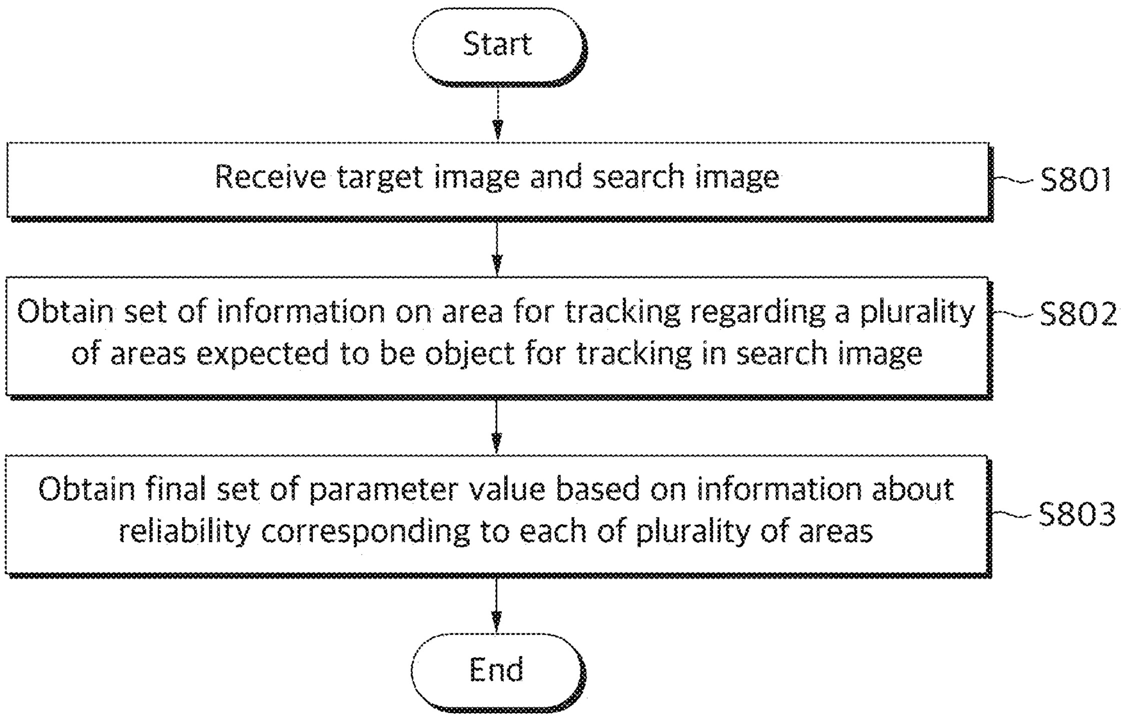
FIG. 8 is a flowchart of operations in which an electronic apparatus performs post-process for an object tracking result based on confidence information according to an example embodiment.

FIG. 8 is a flowchart of operations in which an electronic apparatus performs post-process for an object tracking result based on confidence information according to an example embodiment.

In operation S801, the electronic apparatus 101 may receive a target image and a search image.

In operation S802, the electronic apparatus 101 may obtain a set of information on area for tracking regarding a plurality of areas expected to be the object for tracking. The set of information on area for tracking may include information about a plurality of areas obtained from the model 500 for object tracking in response to one search image. For example, the model 500 for object tracking may output information about which area of the search image the object for tracking included in at least one area of the target image corresponds to. For example, one or more parameter values for at least one area of the search image expressed in the Gaussian distribution described above may be understood as output values of the model 500 for object tracking. Here, the output of the model 500 for object tracking contains information about the area expected to be the object for tracking in the search image, and according to an example embodiment, the model 500 for object tracking may propose multiple areas as areas corresponding to the object for tracking in response to one search area. Therefore, the information about one area for tracking may include parameter values (a set of parameter values) of the corresponding Gaussian distribution, and the model 500 for object tracking may output a set of information on area for tracking including information on area for tracking for each of the plurality of proposed areas. In other words, it may be understood that the set of information on area for tracking includes all sets of parameter values corresponding to each of the various areas ultimately proposed by the model 500 for object tracking.

In operation S803, the electronic apparatus 101 may obtain a final set of parameter values based on information about confidence corresponding to each of the plurality of areas. The final set of parameter values may include parameter values related to an area that is proposed by the electronic apparatus 101 as the area where the object for tracking is present. In an example embodiment, the electronic apparatus 101 may identify a confidence score corresponding to each of the plurality of proposed areas in operation S802. Here, the confidence score may include a confidence score applying a penalty to the size and aspect ratio of each object for tracking. Alternatively, the confidence score may include confidence information determined based on the anchor corresponding to each proposed Gaussian distribution area. The electronic apparatus 101 may obtain the weighted mean of a set of parameter values based on information about the confidence of each corresponding area through Equation 10 below.

$$\mu^t = \frac{1}{n}\sum^{n_{i=1}} p_i \tilde{\mu}_i \text{ and } \sum{}^t = \frac{1}{n}\sum^{n_{i=1}} p_i \tilde{\sum}_i \quad \text{[Equation 10]}$$

Here, t indicates that the search image is an image corresponding to the tth frame in video (in other words, t is a frame index), and the electronic apparatus 101 may select n number of Gaussian predictions (a set of information on area for tracking containing n number of pieces of information on area for tracking) in order of confidence from among a plurality of Gaussian predictions (a set of information on area for tracking containing multiple pieces of information on area for tracking) using the model for object tracking. With regard to the electronic apparatus 101, the weighted mean of n number of Gaussian predictions selected in order may be expressed as Equation 10, and here, $P_i$ may correspond to the confidence score.

In operation S803, the electronic apparatus 101 may obtain a final set of parameter values based on the finally obtained weighted mean value.

Figure 9:
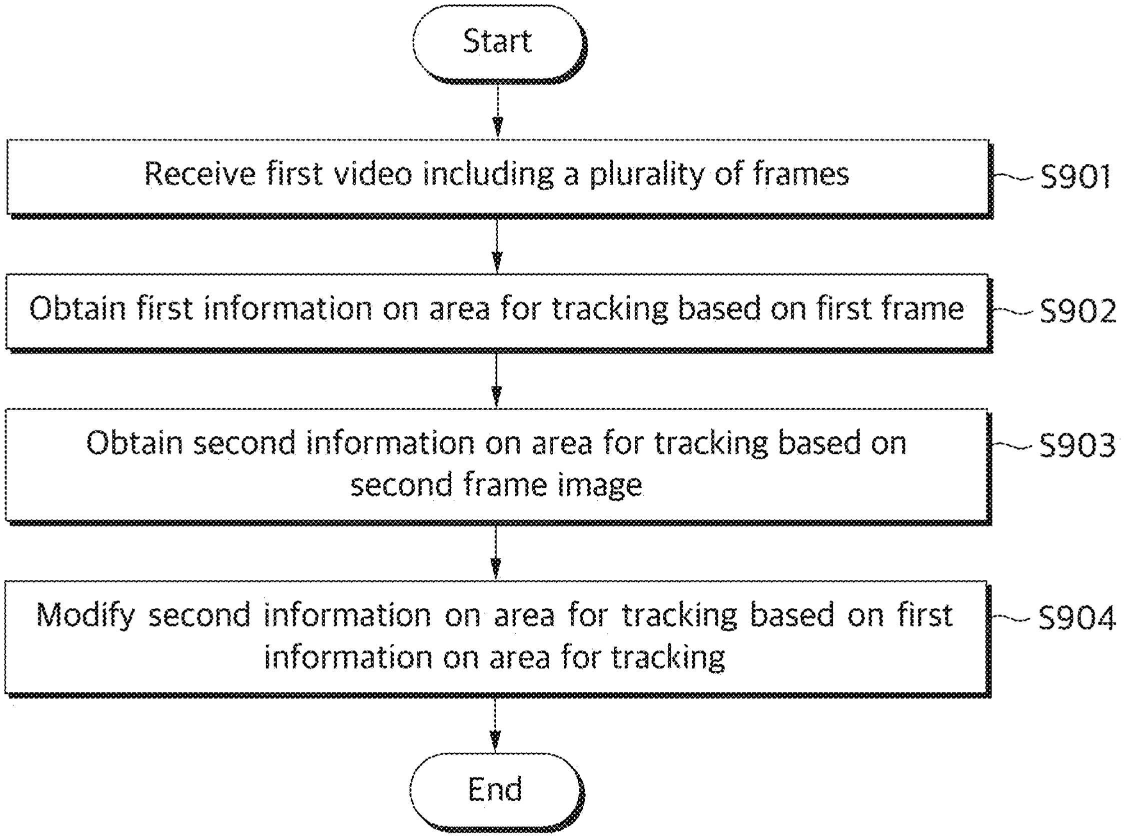
FIG. 9 is a flowchart of operations in which an electronic apparatus performs post-process for an object tracking result based on timestamps of frames, according to an example embodiment.

FIG. 9 is a flowchart of operations in which an electronic apparatus performs post-process for an object tracking result based on timestamps of frames, according to an example embodiment.

In operation S901, the electronic apparatus 101 may receive first video including a plurality of frames. Here, at least some of the plurality of frames included in the first video may be input as input images to the model for object tracking. Here, among the plurality of frames selected as inputs, the electronic apparatus 101 may input the most preceding frame as a target image into the model for object tracking, and input each frame after the most preceding frame as a search image into the model for object tracking.

In operation S902, first information on area for tracking may be obtained based on the first frame. In operation S903, second information on area for tracking may be obtained based on a second frame image. In operation S902, the electronic apparatus 101 may input the first frame, which is at least a part of the same first video, into the model for object tracking to obtain first information on area for tracking of the first area for tracking corresponding to the first frame. Further, in operation S903, the electronic apparatus 101 may input a second frame, which is at least a part of the first video, into the model for object tracking to obtain second information on area for tracking of a second area for tracking corresponding to the second frame. Here, the first frame may be a frame preceding the second frame.

In operation S904, the electronic apparatus 101 may modify the second information on area for tracking based on the first information on area for tracking. The information on area for tracking may include one or more parameter values regarding the Gaussian distribution corresponding to the area for tracking. For example, the information on area for tracking may include parameter values regarding a location of an area for tracking, parameter values regarding the shape and parameter values regarding the rotation angle. Here, the first frame and the second frame may correspond to two consecutive frames or two frames at a specified frame interval in the same video. Here, the degree to which the shape is transformed may be lower than the degree to which the object moves its position in consecutive frames of the same video. Therefore, the electronic apparatus 101 may modify the information on area for tracking of a subsequent frame based on the information on area for tracking of the previous frame. Specifically, the electronic apparatus 101 may modify parameter values related to the shape or rotation angle of the area for tracking. In an example embodiment, the electronic apparatus 101 may perform a post-process for the second information on area for tracking based on linear interpolation of the first information on area for tracking of the first frame corresponding to timestamp t−1, and the second information on area for tracking in the second frame corresponding to timestamp t, as shown in Equation 11 below.

$$\mu^t \leftarrow \mu^t \text{ and } \Sigma^t \leftarrow \gamma^t\Sigma^t + (1-\gamma^t)\Sigma^{t-1} \quad \text{[Equation 11]}$$

Here in Equation 11, $\gamma$ is a weight determined based on a confidence score for each timestamp, and may ensure that the estimated target state maintains smoothness over several frames.

The example embodiments described in the present disclosure may be implemented in the form of program instructions that can be executed through various computer components and recorded on a computer-readable recording medium or non-transitory recording medium. The computer-readable recording medium or the non-transitory recording medium may include program instructions, data files and data structures or a combination thereof. The program instructions recorded on the computer-readable recording medium or the non-transitory recording medium may be specifically designed and configured for the example embodiments of the present disclosure, or the program instructions may be known and usable by those skilled in the computer software field. Examples of the computer-readable recording medium or the non-transitory recording medium include magnetic media such as hard disk, floppy disk and magnetic types, optical recording media such as CD-ROM and DVD, magneto-optical media such as floptical disk, and a specifically configured hardware devices to store and perform program instructions, such as ROM, RAM and flash memory. Examples of the program instructions include not only machine language codes such as that generated by a complier, but also high-level language codes that can be executed by a computer using an interpreter. The hardware apparatus or electronic apparatus may be configured to operate as one or more software modules to perform processing according to the present disclosure, and vice versa.

The example embodiments may be represented by functional block elements and various processing steps. The functional blocks may be implemented in any number of hardware and/or software configurations that perform specific functions. For example, an example embodiment may adopt integrated circuit configurations, such as memory, processing, logic and/or look-up table, that may execute various functions by the control of one or more microprocessors or other control devices. Similar to that elements may be implemented as software programming or software elements, the example embodiments may be implemented in a programming or scripting language such as C, C++, Java, assembler, etc., including various algorithms implemented as a combination of data structures, processes, routines, or other programming constructs. Functional aspects may be implemented in an algorithm running on one or more processors. Further, the example embodiments may adopt the existing art for electronic environment setting, signal processing, and/or data processing.

It will be apparent to those skilled in the art that various modifications and variations can be made in the embodiments of the present invention without departing from the spirit or scope of the invention. Thus, it is intended that the present invention cover the modifications and variations of this invention provided they come within the scope of the appended claims and their equivalents.

What is claimed is:

1. A method of object tracking based on deep-learning performed in an electronic apparatus, the method comprising:

pre-training a model for object tracking based on pre-input learning data;

receiving a target image of which at least one area contains an image corresponding an object for tracking and a search image of which at least one area contains an image corresponding the object for tracking; and obtaining information on area for tracking regarding to the area corresponding to the object for tracking in the search image by applying the model for object tracking, wherein the area corresponding to the object for tracking is defined by a Gaussian distribution model, wherein the information on area for tracking includes parameter values of a plurality of parameters based Gaussian distribution corresponding to the area corresponding to the object for tracking, and wherein the model for object tracking includes a Siamese Region Proposal Network (RPN) structure and a refining module configured to perform a rotated region of interest (ROI) aligning operation based on bilinear interpolation to generate a Gaussian prediction comprised of the plurality of parameters during tracking.

2. The method of claim 1, wherein the plurality of parameters include at least parameters related to position coordinates of the Gaussian distribution, parameters related to a shape of the Gaussian distribution and parameters related to a rotation angle of the Gaussian distribution.

3. The method of claim 1, wherein the pre-training the model for object tracking further includes updating parameters corresponding to at least one layer included in the model for object tracking in a direction of minimizing a result value of a loss function, wherein the loss function is set to indicate a difference between the information on area for tracking obtained by applying the model for object tracking and a ground truth included in the learning data.

4. The method of claim 3, wherein the loss function is defined based on a Kullback-Leibler divergence value between Gaussian distribution corresponding to the information on area for tracking and Gaussian distribution corresponding to the ground truth.

5. The method of claim 1, wherein the RPN includes an area proposal module for obtaining candidate area information corresponding to the at least one area of the search image based on at least one convolution layer for obtaining a feature map from the target image and the search image and the feature maps; and the model for object tracking includes a refining module including at least one fully connected layer for obtaining the information on area for tracking from the feature maps and the candidate area information obtained from the RPN.

6. The method of claim 5, wherein the Siamese RPN structure includes a first branch that receives the target image as an input and includes at least one convolution layer and a second branch that receives the search image as an input and includes at least one convolution layer that share parameters with at least one layer of the first branch, wherein, based on a cross-correlation operation performed based on a first feature map obtained from the at least one convolution layer of the first branch and a second feature map obtained from the at least one convolution layer of the second branch, the area proposal module obtains a Gaussian feature map including information on a Gaussian area and a class feature map that contains information about a score corresponding to at least one anchor that is set in each of at least one area of the search image, the method further comprising obtaining candidate area information based on a score for each anchor identified based on the class feature map and the Gaussian feature map.

7. The method of claim 5, wherein the refining module receives the candidate area information and the feature map obtained from the RPN as inputs, and obtains a feature map corresponding to a candidate area based on a rotated region of interest (ROI) aligning operation based on bilinear interpolation, and the refining module is configured to obtain the information on area for tracking based on the feature map corresponding to the candidate area.

8. The method of claim 1, wherein the information on area for tracking corresponding to the object for tracking includes a plurality of parameter values for a plurality of areas and information about confidence corresponding to each of the plurality of areas, the method further comprising obtaining a weighted-mean value of the plurality of parameter values based on the information about the confidence.

9. The method of claim 1, wherein the search image includes a first frame image included in first video containing a plurality of frames and a second frame image after the first frame image, the method further comprising:

obtaining first information on area for tracking based on the first frame image;

obtaining second information on area for tracking based on the second frame image; and modifying parameter values related to a shape and parameter values related to a rotation angle of an area corresponding to the object for tracking in the second information on area for tracking based on the first information on area for tracking.

10. An electronic apparatus, comprising:

a memory; and a processor, wherein the processor is configured to:

pre-train a model for object tracking based on pre-input learning data;

receive a target image of which at least one area contains an image corresponding an object for tracking and a search image of which at least one area contains an image corresponding the object for tracking; and obtain information on area for tracking regarding to the area corresponding to the object for tracking in the search image by applying the model for object tracking, wherein the area corresponding to the object for tracking is defined by a Gaussian distribution model, wherein the information on area for tracking includes parameter values of a plurality of parameters based Gaussian distribution corresponding to the area corresponding to the object for tracking, and wherein the model for object tracking includes a Siamese Region Proposal Network (RPN) structure and a refining module configured to perform a rotated region of interest (ROI) aligning operation based on bilinear interpolation to generate a Gaussian prediction comprised of the plurality of parameters during tracking.

11. A computer-readable non-transitory recording medium having a program for executing a method of object tracking based on deep-learning on a computer, wherein the method includes:

pre-training a model for object tracking based on pre-input learning data;

receiving a target image of which at least one area contains an image corresponding an object for tracking and a search image of which at least one area contains an image corresponding the object for tracking; and obtaining information on area for tracking regarding to the area corresponding to the object for tracking in the search image by applying the model for object tracking, wherein the area corresponding to the object for tracking is defined by a Gaussian distribution model, wherein the information on area for tracking includes parameter values of a plurality of parameters based Gaussian distribution corresponding to the area corresponding to the object for tracking, and wherein the model for object tracking includes a Siamese Region Proposal Network (RPN) structure and a refining module configured to perform a rotated region of interest (ROI) aligning operation based on bilinear interpolation to generate a Gaussian prediction comprised of the plurality of parameters during tracking.

* * * * *